United States Patent [19]
Christenson et al.

[11] Patent Number: 4,638,020
[45] Date of Patent: Jan. 20, 1987

[54] AQUEOUS COMPOSITION COMPRISING A PHOSPHATED EPOXY AND NON-SELF DISPERSIBLE RESIN

[75] Inventors: Roger M. Christenson, Gibsonia; Mary E. Rosenberger, Allison Park; Marvin T. Tetenbaum, Wexford, all of Pa.

[73] Assignee: PPG Industries, Inc., Pittsburgh, Pa.

[21] Appl. No.: 674,452

[22] Filed: Nov. 23, 1984

[51] Int. Cl.$^4$ .............................................. C08L 63/02
[52] U.S. Cl. .................................... 523/406; 428/413; 428/418; 523/402; 523/413; 523/414; 523/415; 523/416; 523/424
[58] Field of Search ............... 523/402, 424, 406, 413, 523/414, 415, 416; 528/108; 428/418, 413

[56] References Cited

U.S. PATENT DOCUMENTS

| | | | |
|---|---|---|---|
| 2,541,027 | 2/1951 | Bradley | 148/6.15 |
| 3,908,049 | 9/1975 | Fitko | 427/386 |
| 4,059,550 | 11/1977 | Shimp | 260/29.4 R |
| 4,164,487 | 8/1979 | Martin | 260/29.2 EP |
| 4,289,812 | 9/1981 | Martin | 427/379 |
| 4,316,922 | 2/1982 | Perine et al. | 428/35 |
| 4,425,451 | 1/1984 | Sekmakas et al. | 523/414 |
| 4,452,929 | 6/1984 | Powers et al. | 523/403 |
| 4,461,857 | 7/1984 | Sekmakas et al. | 523/414 |
| 4,487,860 | 12/1984 | Winner et al. | 523/408 |
| 4,487,861 | 12/1984 | Winner | 523/428 |
| 4,503,173 | 3/1985 | Martino et al. | 523/407 |

FOREIGN PATENT DOCUMENTS 0101307 2/1984 European Pat. Off. .

Primary Examiner—Theodore E. Pertrilla
Attorney, Agent, or Firm—Godfried R. Akorli

[57] ABSTRACT

Disclosed herein are aqueous compositions comprising a base-neutralized blend of non-gelled phosphated epoxy and a resin which is non-self dispersible with a base, in water. Coating compositions of these blends are stable and form hydrophobic films of enhanced film properties, particularly in the area of can coatings.

30 Claims, No Drawings

AQUEOUS COMPOSITION COMPRISING A PHOSPHATED EPOXY AND NON-SELF DISPERSIBLE RESIN

BACKGROUND OF THE INVENTION

1. Field of the Invention: The present invention relates to an aqueous composition of phosphated epoxy resins and non-self water-dispersible resins, and methods of making and using same. More specifically, the present invention relates to water-based coatings of the above compositions which have been found to be very suitable for can or coil coatings.

2. Brief Description of the Prior Art: Resinous blends containing acrylic and/or epoxy resins are generally known in the art. In a number of instances, the resinous blends are limited in their use as essential film-formers because of problems of incompatibility of the resins with one another or with the medium in which they are present. The problem of incompatibility results in less than the desirable stability of coating compositions of the blends and also results in less than the required film properties such as film continuity, flexibility, adhesion and other desirable film properties.

In the instance of water-based compositions, it is seemingly more problematic to prepare coatings comprising resinous blends having the afore-stated properties. On one hand, the resins are made compatible with water typically by the use of hydrophilic groups such as acid salt groups. Without the hydrophilic groups, the resin, seemingly, would be non-self dispersible in water. On the other hand, the hydrophilic groups may present a rather serious problem of less than the desirable film durability. In the area of can coatings in particular, the above problems are unacceptable. Coatings intended for use in food and beverage industries must meet stringent property requirements in order to be useful for this purpose. The coating must adhere well to the base metal and must possess a certain set of flexibility, extensibility and adhesion characteristics so as to withstand the processing of the container itself. The coating must also be able to resist heat which can be encountered during processing of the container. Additionally, the coating itself must not affect the taste of a food or beverage which is put into the coated container.

The present invention provides a means of employing resins that are not self-dispersible with a base in water, in combination with phosphated epoxy resins to produce a water-dispersible blend.

SUMMARY OF THE INVENTION

The present invention encompasses an aqueous composition comprising (i) a base, (ii) a non-gelled phosphated-epoxy which is derived from reacting an epoxy material with a phosphoric acid, (iii) a resin which is non-self dispersible with a base, in water, and (iv) water.

The present invention further encompasses a preferred process for dispersing in water a resin which is non-self dispersible with a base in water, said process comprising (1) preforming a blend of the resin and an ungelled phosphated-epoxy which is derived from reacting an epoxy material with a phosphoric acid, and (2) dispersing the blend with a base and water. The aqueous compositions derived from the preformed blends are also encompassed by the claimed invention.

The expression "preformed blend" or "preforming a blend" is intended to denote that the blend is formed, before it is subsequently neutralized and/or dispersed in water. The term "disperse" or "dispersion" is intended to denote a dispersed phase in an aqueous continuous medium.

Coating compositions comprising the above aqueous compositions, and articles of matter prepared therewith are also encompassed by the present invention. The coating compositions in the practice of this invention can contain curing agents.

The aqueous compositions and coating compositions thereof have been found to be stable. By this is meant that the compositions do not settle or otherwise detrimentally alter in their integrity to the extent of becoming impractical for intended use.

It has also been found that films derived from these coating compositions have good appearance, good fabricating properties, durability and other desirable properties. Hence, the likes of beer, carbonated and non-carbonated beverages can be packed in containers which have been coated with these compositions.

DETAILED DESCRIPTION OF THE INVENTION

The phosphated epoxy is prepared as follows. Typically, the Preparation entails reacting a polyepoxide resin with phosphoric acid or an equivalent thereof.

The polyepoxide resin useful herein is a compound or a mixture of compounds having more than 1.0 epoxy groups per molecule and epoxy equivalent weight of 190 to 3800 and preferably 800 to 3800. Several polyepoxide resins are known examples of which can be found in the HANDBOOK OF EPOXY RESINS, Lee and Neville, 1967, McGraw-Hill Book Company.

A preferred class of polyepoxides are the polyglycidyl ethers of polyphenols, such as bisphenol A. These are produced by etherification of a polyphenol with epichlorohydrin in the presence of an alkali. The phenolic compound can be 1,1-bis(4-hydroxyphenyl)ethane; 1,1-bis(4hydroxyphenyl)isobutane; 2,2-bis(4-hydroxytertiarybutylphenyl)propane; bis(2-hydroxynaphthyl)methane; 1,5-dihydroxynaphthalene; and 1,1-bis(4-hydroxy-3-allylphenyl)ethane. Another quite useful class of polyepoxides are produced similarly from polyphenol resins.

Also suitable are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and 2,2-bis(4-hydroxycyclohexyl)propane.

Cycloaliphatic polyepoxide resins can also be used. Such resins are prepared by epoxidation of cyclic olefins with organic peracids, e.g., peracetic acid.

Another useful class of polyepoxides are those containing oxyalkylene groups in the epoxy molecule. Such oxyalkylene groups are typically groups of the general formula:

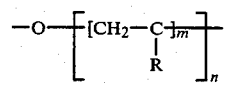

wherein R is hydrogen or alkyl, preferably lower alkyl (e.g., having 1 to 6 carbon atoms) and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of modification desired.

In addition to the polyepoxide resins described above, addition polymerization polymers containing pendent epoxy groups are also utilized in this invention. Such polymers are made by copolymerizing a wide variety of polymerizable vinyl monomers including monomers such as glycidyl acrylate and glycidyl methacrylate. Suitable vinyl monomers include those which do not contain a group reactive with the epoxy group and preferably include the alpha, beta-ethylenically unsaturated carboxylic acid esters of saturated alcohols containing from 1 to 8 carbon atoms and the monovinyl aromatic monomers of the benzene class, e.g., styrene and vinyl toluene.

Hydantoin-based polyepoxide resins as described in U.S. Pat. No. 4,110,287, issued Aug. 29, 1978 to Bosso and Castellucci, and in an article in Die Angewandte Makromolekulare Chemie, by Jurgen Habermeier, Vol. 63, (1977), pages 63–104 (the disclosures of which are hereby incorporated by reference), can also be used.

As above indicated, the polyepoxide resin is reacted with a phosphoric acid or a functional equivalent thereof. The phosphoric acid can be a superphosphoric acid, a 100 percent orthophosphoric acid or the aqueous solutions thereof such as 85 percent phosphoric acid aqueous solution. Other forms of the phosphoric acid such as diphosphoric acid and triphosphoric acid can be used. Also, the polymeric or partial anhydrides of the phosphoric acids can be used.

Typically useful herein are aqueous phosphoric acids which are of about 70 to 90 percent and usually about 85 percent phosphoric acid. The phosphoric acid is reacted with the polyepoxide in amounts sufficient to produce a resultant phosphated epoxy which is self-dispersible with a base, in water. Typically, the ratio of reactants is about 0.1 to 1 mole and preferably 0.1 to 0.5 mole of phosphoric acid per equivalent of epoxy. The reaction of the polyepoxide resin with the phosphoric acid can be conducted by methods that are well known in the art. The resultant phosphated epoxy is neutralized with a base, as described hereinafter.

A solvent or mixture of solvents is preferably included in the reaction of the epoxy resin and phosphoric acid for the purpose of achieving better reaction control. Any non-reactive solvent can be used, examples of which include the ketones, ethers and alcohols. Specific examples of suitable solvents are methyl ethyl ketone, methyl butyl ketone, ethanol, propanol, isopropanol and butanol. Surprisingly, the alcohol can oftentimes be used as a solvent.

As afore-stated, the phosphated epoxy can be blended with a resin which is non-self dispersible with a base, in water. Typically, these non-self dispersible resins are substantially free of acid group. By substantially free is meant the resins can be acid-free or low acid-containing.

It would seem that acid-free or low acid-containing resins would be less desirable in resinous blends for use in preparing aqueous dispersions. For, these resins, unlike the likes of high carboxylic acid-containing resins, are deemed to be less likely to produce hydrophilic salt groups which will effectively render them compatible with water. Surprisingly, however, the non-self dispersible resins in accordance with this invention are made compatible with water and thus form excellent dispersions.

Non-limiting examples of the non-self dispersible resins are vinyl addition resins, polyesters, alkyds, a polyurethane and the like that are substantially free of acid group. Low acid-containing resins preferred herein are vinyl addition resins which can be prepared by polymerizing from about 4 percent or less and preferably 1 percent or less by weight of an alpha, beta-ethylenically unsaturated carboxylic acid with at least one other suitable copolymerizable vinyl monomer. The percent by weight is based on the total weight of the copolymerizable monomers. Examples of suitable alpha, beta-ethylenically unsaturated carboxylic acids are those containing from 3 to 8 carbon atoms such as acrylic acid and methacrylic acid, both of which are preferred. Acids such as itaconic acid, maleic acid, fumaric acid, mono-esters of unsaturated dicarboxylic acids, e.g., methyl hydrogen maleate and ethyl hydrogen fumarate as well as anhydrides thereof where they exist, can also be used.

The copolymerizable vinyl monomer is selected from a wide variety of materials depending upon the properties desired. For example, at least a portion of the other copolymerizable monomer can be a vinyl aromatic compound such as styrene, alpha-methyl styrene, tertiary butylstyrene, vinyltoluene and vinylxylene. Such monomers are preferred because of their good water and pasteurization resistance. Other monomers which are used are the alkyl esters of methacrylic acid which contain from 1 to 3 carbon atoms in the alkyl group. Specific examples of such esters are methyl methacrylate and ethyl methacrylate. Monomers which can be used and which provide flexibility to the coating are the alkyl esters of acrylic acid having from 2 to 12 carbon atoms in the alkyl group and alkyl esters of methacrylic acid having from 4 to 12 carbon atoms in the alkyl group. Examples of monomers of this type are ethyl acrylate, propyl acrylate, butyl acrylate, hexyl acrylate, 2-ethylhexyl acrylate, butyl methacrylate, and 2-ethylhexyl methacrylate.

Preferably, at least one of the copolymerizable monomers is an ethylenically unsaturated monomer containing N-alkoxymethylamide groups. Examples of these monomers are N-(alkoxymethyl)acrylamides and N-(alkoxymethyl)methacrylasides having 1 to 4 carbon atoms in the alkoxy group, and N-methylolacrylamide and N-(methylol)methacrylaride can also be used. Preferred herein are N-ethoxymethyl)acrylamide and N-(butoxymethyl)acrylamide. These monomers exhibit the best balance of stability and efficient curing. The proportion of this monomer is from about 5 to 50 and preferably 15 to 30 percent by weight based on the total weight of the copolymerizable monomers.

Still other monomers include the vinyl compounds, e.g., ethylene, propylene; the vinyl handles, vinylidene halides, vinyl versatate, vinyl acetate, dialkyl maleate, allyl chloride, allyl alcohol, 1,3-butadiene, 2-chlorobutene, methyl vinyl ether, acrylamide, methacrylamide, acrylonitrile, and methacrylonitrile. Mixtures of any of the above-described vinyl monomers can be used.

Vinyl addition resins described above can be prepared by free radical initiated polymerization of a mixture of the copolymerizable acrylic monomers by solution polymerization techniques. Usually, the monomers are dissolved in a solvent or a mixture of solvents and polymerized until the free monomeric content is reduced to below about 0.5 percent, preferably below about 0.1 percent. Examples of free radical initiators include azobis(alpha-gamma)-dimethylvaleronitrile, tertiary-butyl perbenzoate, tertiary-butyl peracetate and benzoyl peroxide.

Solvents which can be used in the polymerization step include alcohols such as ethanol, tertiary butanol, tertiary amyl alcohol; ketones such as acetone, methyl ethyl ketone; and ethers such as the dimethyl ether of ethylene glycol or a mixture thereof. The aforementioned solvents are either water-soluble or water-miscible. Moderate levels of water-insoluble solvents such as toluene can also be used. Usually, the solvent is first heated to reflux and a mixture of the monomers and the free radical initiator are added simultaneously and slowly to the refluxing solvent. Additional catalyst is optionally added and the reaction mixture held at polymerizing temperatures so as to reduce the free monomer content of the reaction mixture. The resultant vinyl addition resin typically has a molecular weight of about 5000 to 90,000 or higher. Surprisingly, it has been found in accordance with this invention that when blended with phosphated epoxy, the vinyl addition resins which are substantially free of acid and of relatively low molecular weight of about 8000 to 20,000 can form coatings of good properties, flexibility, alkaline and acid resistance, and adhesion. The molecular weight expressed herein is a weight average molecular weight which is determined by gel permeation chromatography using polystyrene standards.

The aqueous compositions have from about 5 percent to about 90 percent, preferably from about 20 percent to about 75 percent of the vinyl addition resin and from about 10 percent to about 95 percent, preferably from about 20 percent to about 75 percent of the phosphated epoxy resin. The solids content of the compositions range from about 20 percent to about 60 percent with the balance of the composition comprising water, organic solvent, or a mixture of water and organic solvent. Compositions wherein water is the major liquid carrier are preferred.

In a preferred embodiment of the claimed invention, the aqueous composition is prepared by the preferred process comprising preforming a blend of the non-self dispersible resin with the phosphated epoxy by admixing same, followed by dispersing the blend with a base and water. That is, the preformed blend can be neutralized with a base and then dispersed in water; or the preformed blend can be dispersed in a mixture of water and a base. Resulting therefrom are excellent dispersions.

It is noteworthy that by this process stable dispersions of excellent properties can be obtained with substantially less mechanical mixing. It is also noteworthy that excellent dispersions are formed with non-dispersible resins, particularly those that are substantially free of acid groups. The resultant dispersions have a particle size ranging from about 500 to 8000 Angstroms and preferably from about 3000 to 4500 Angstroms.

The bases useful herein can be organic or inorganic. Preferably, the bases are volatile. By this is meant that the bases are weak or would volatilize from compositions containing same when baked during cure cycles. Illustrative examples of the bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine and propanolamine; and morpholine, e.g., N-ethylmorpholine which is preferred. The bases effect neutralization to a degree such as would make the resinous blends water-dispersible. Typically, the resinous blend is at least partially neutralized from about 40 to 150 percent and preferably 60 to 100 percent neutralization.

In the practice of this invention wherein it is often desirable to get a more durable film, an external crosslinking agent can be added to the above-described blends in preparing film-forming compositions. When external crosslinking agents are used, the components of the blend contain active hydrogen groups such as hydroxyl groups. Examples of the crosslinking agents include the aminoplast resins, phenoplast resins, and blocked polyisocyanate resins. The level of crosslinking agent used as part of the film-forming resin ranges up to about 40 percent, and is preferably from about 5 percent to about 20 percent of the film-forming resin. While vinyl addition resins derived from N-alkoxymethylmethacrylamide and N-alkoxymethylacrylamide are capable of crosslinking without an external crosslinking agent, such agents can, nevertheless, still be added.

Aminoplast resins are the condensation products of an aldehyde, e.g., formaldehyde, acetaldehyde, crotonaldehyde, and benzaldehyde with an amino- or amido group-containing substance, e.g., urea, melamine, and benzoguanamine. Products obtained from the reaction of alcohols and formaldehyde with melamine, urea or benzoguanamine are preferred in the aqueous-based coating compositions because of their good water dispersibility. Useful alcohols used to make the etherified products are the monohydric alcohols, such as methanol, ethanol, propanol, butanol, hexanol, benzyl alcohol, cyclohexanol, and ethoxyethanol. An etherified melamine-formaldehyde resin is the preferred aminoplast resin. U.S. Pat. No. 4,075,141 to Porter et al, issued Feb. 21, 1978, contains a description of useful aminoplast resins and is incorporated herein by reference.

Phenolic resins include the condensation product of an aldehyde with a phenol. Formaldehyde and acetaldehyde are preferred aldehydes. Various phenols can be used, e.g., phenol per se, cresol, p-phenylphenol, p-tert-butylphenol, p-tert-amylphenol and cyclopentylphenol. The methylolphenol ethers described in U.S. Pat. No. 2,597,330 (herein incorporated by reference) are especially useful.

A number of blocked polyisocyanates are satisfactory crosslinking agents. These agents are well known in the art. Generally, the organic polyisocyanates are blocked with a volatile alcohol, epsiloncaprolactone or ketoxime. These blocked polyisocyanates become unblocked at elevated temperatures, e.g., above about 100° C. "The Chemistry of Organic Film Formers", Robert E. Kreiger Pub. Co., copyrighted 1977, by D. H. Solomon, pages 216–217, contains a description of many blocked isocyanates that can be used here. The disclosure of this publication is herein incorporated by reference.

In coating compositions, the ratio of the non-self dispersible resin to the phosphated epoxy will vary depending on the nature of the resins and the type of coatings desired. The phosphated epoxy is used in an amount sufficient to effect a dispersion. For example, in general, on a resin solids basis, there is employed from about 5 to 90 percent and preferably from about 10 to 50 percent of the non-self dispersible resin and the remainder being the phosphated epoxy.

The coating compositions of this invention may contain other optional components such as pigments, fillers, anti-oxidants, flow control agents, surfactants and the like.

The coating composition can be applied to substrates such as aluminum substrates by electrophoretic or non-electrophoretic means. It has been found that the coating compositions are well suited to application by roll-coating. In interior can coatings, thin films are required. Hence, film thickness in this area is in the range of about 0.01 to 1.0 and preferably 0.1 to 0.5 mil.

After coating, the substrate is removed and then baked in an oven at temperatures and over a period sufficient to effect cure thereof. Typically, the coated substrate is baked at temperatures of about 135° C. to 400° C. for about 10 seconds to 30 minutes.

It would be appreciated that on fast coil lines, having about 8 seconds dwell time at about 232° C. peak metal temperatures, the coatings of this invention perform extremely well. Illustratively, films of about 33 milligrams per 4 square inches can be cured without causing popping or blistering. Cure response of films derived from the coating compositions of this invention is excellent. Illustratively, with cure schedules of about 8 seconds dwell time at 188° C. peak metal temperature, films of excellent properties can be obtained.

The coatings have good fabricating properties such as adhesion, film continuity, blush resistance, and the like. Also, the coatings have good appearance, durability and other desirable film properties. It is noteworthy that wherein the non-self dispersible resin with relatively low molecular weight is employed in the blend, the coatings obtained in the manner of this invention possess good fabricating properties as well as other desirable film properties.

The following are non-limiting examples of the invention that are intended to be illustrative as opposed to limiting the invention as claimed herein.

EXAMPLE I

This illustrates the water-based resinous blends of an acrylic resin and a phosphated epoxy resin.

Part 1

The acrylic resin was prepared as follows.

| Ingredients | Parts by Weight (grams) |
|---|---|
| Reactor Charge | |
| Isopropanol | 50 |
| Diethylene glycol butyl ether | 500 |
| Butanol | 100 |
| SHELLMAX[1] | 67.2 |
| Initiator Charge | |
| t-butyl perbenzoate | 20.6 |
| Diethylene glycol butyl ether | 100 |
| Monomer Mix Charge | |
| Ethyl acrylate | 1478.4 |
| Methacrylic acid | 16.8 |
| N—butoxymethylacrylamide (61.5% solids) | 300.5 |
| Rinse | |
| Diethylene glycol butyl ether | 12.5 |
| Initiator (Scavenger) Charge | |
| t-butyl perbenzoate | 16.2 |
| Diethylene glycol butyl ether | 30.0 |

[1] A wax material, available from Shell Chemical Company.

The reactor charge was heated to reflux. The Initiator Charge and the Monomer Charge were added over a period of 3 hours at a temperature range of 128°–124° C. With the addition completed and at 125° C., the rinse was added followed by addition of the Initiator (Scavenger) Charge divided in three equal portions. After each addition, the reaction mixture was held for 90 minutes. The resultant mixture was cooled and discharged.

Analysis: Percent solids was 65.2, milliequivalents of acid was 0.180 and viscosity was 1370 centipoise with a No. 4 spindle at 20 rpm.

Part 2

A phosphated epoxy was prepared and blended with the above vinyl addition resin, and the resultant blend was neutralized as follows.

| Ingredients | Parts by Weight (grams) |
|---|---|
| Charge I | |
| EPON 1007[1] | 1072.1 |
| Diethylene glycol monobutyl ether | 440.2 |
| Charge II | |
| 85% Phosphoric acid | 11.9 |
| Rinse | |
| Diethylene glycol monobutyl ether | 24.7 |
| Charge III | |
| Deionized water | 21.1 |
| Charge IV | |
| Vinyl addition resin of Part 1 | 332.5 |
| Charge V | |
| N—ethyl-morpholine | 18.7 |
| Deionized water | 1692.1 |

[1] An epoxy resin having an epoxy equivalent of 1847 which is available from Shell Chemical Company.

In a properly equipped reaction vessel, Charge I was heated to dissolve at 122° C. Charge II was added thereto followed by the addition of the rinse. The resultant reaction mixture was held at 123° C. for 30 minutes. At 121° C., Charge III was added over 10 minutes. With the completion of this addition, the reaction mixture was held for 2 hours at 117°–124° C. At 124° C., Charge IV was added and the reaction mixture was stirred for 30 minutes. Thereafter, the reaction mixture was thinned in Charge V and then reduced to a solids content of 36.7. The resultant aqueous dispersion had a viscosity of 641 centipoise measured with a No. 4 spindle at 50 rpm, milliequivalents of acid of 0.069, milliequivalents of base of 0.057 and pH of 7.06.

With the order of addition of Charges IV and V reversed, one does not obtain a stable dispersion.

EXAMPLE II

This illustrates the resinous blends of this invention and the methods of preparing and using same.

Part 1

An acrylic resin was prepared in essentially the same manner as described in Part 1 of Example I. The following were used in the preparation.

| Ingredients | Parts by Weight (grams) |
|---|---|
| Reactor Charge | |
| Diethylene glycol butyl ether | 1000 |
| Methyl ethyl ketone | 150 |
| Initiator Charge | |
| Benzoyl peroxide | 20.6 |
| Toluene | 51.5 |
| Methyl ethyl ketone | 73.6 |
| Monomer Charge | |

-continued

| Ingredients | Parts by Weight (grams) |
|---|---|
| Ethyl acrylate | 1478.4 |
| Methacrylic acid | 16.8 |
| N—butoxymethylacrylamide (61.5% solids) | 300.5 |

Part 2

A phosphated epoxy was prepared in essentially the same manner and blended with the above vinyl addition resin, as described in Example I, Part 2.

| Ingredients | Parts by Weight (grams) |
|---|---|
| Charge I | |
| EPON 1007 | 1072.1 |
| Diethylene glycol butyl ether | 357.4 |
| Charge II | |
| Phosphoric acid (85 percent) | 11.9 |
| Rinse | |
| Diethylene glycol butyl ether | 24.7 |
| Charge III | |
| Deionized water | 21.1 |
| Charge IV | |
| The vinyl addition resin | 415.3 |
| Charge V | |
| N—ethylmorpholine | 18.7 |
| Deionized water | 1502.0 |

The resultant aqueous dispersion had a solids content of 38.7 percent, viscosity of 3417.5 centipoise measured at 50 revolutions per minute with a number 4 spindle, milliequivalents of acid was 0.189, milliequivalents of base was 0.121, particle size was 3900 Å (6) and pH was 7.03.

With the order of addition of Charges IV and V reversed, one does not obtain a stable dispersion.

A coating composition of the above resinous blend was evaluated as follows. The coating was drawn down on an aluminum substrate which had been pretreated by phosphating and chromic acid rinse and was baked at 193° C. for 10 minutes. The coating formed a clear continuous film upon baking. The coating had a film weight of 32.8 milligrams per 4 square inches, wedge bend failure at 24 millimeters determined after a 30-second immersion in coppar sulfate solution. The coating had a good solvent resistance in that 6 double-rubs (of methyl ethyl ketone) were required to affect the integrity of the film, a 15-minute boil in a surfactant solution produced no significant effect on adhesion; blush adhesion was excellent and feathering blush was very good; the general film properties were excellent.

EXAMPLE III

This also illustrates the water-based resinous blends of the Present invention and the methods of preparing and using same.

Part 1

An acrylic resin was prepared in essentially the same manner as disclosed in Part 1 of Example I. The following were used in the preparation.

| Ingredients | Parts by Weight (grams) |
|---|---|
| Reactor Charge | |
| Isopropanol | 50 |

| Ingredients | Parts by Weight (grams) |
|---|---|
| Diethylene glycol butyl ether | 500 |
| Butanol | 100 |
| SHELLMAX | 67.2 |
| Initiator Charge | |
| t-butyl perbenzoate | 20.6 |
| Diethylene glycol butyl ether | 100 |
| Monomer Charge | |
| Styrene | 16.8 |
| Ethyl acrylate | 1461.6 |
| Methacrylic acid | 16.8 |
| N—butoxymethylacrylamide (61.5% solids) | 300.5 |
| Rinse | |
| Diethylene glycol butyl ether | 12.5 |
| Initiator (Scavenger) Charge | |
| t-butyl perbenzoate | 16.3 |
| Diethylene glycol butyl ether | 30.0 |

The resultant acrylic resin had a solids content of 64.3 percent, milliequivalents of acid of 0.198, and viscosity of 1875 centipoise measured with a No. 6 spindle at 50 rpm.

The above acrylic resin was blended with a phosphated epoxy which was prepared in situ as follows:

| Ingredients | Parts by Weight (grams) |
|---|---|
| Charge I | |
| EPON 1007 | 1072.1 |
| Diethylene glycol butyl ether | 445.9 |
| Charge II | |
| Phosphoric acid (85%) | 11.9 |
| Diethylene glycol butyl ether | 24.7 |
| Charge III | |
| Deionized water | 21.1 |
| Charge IV | |
| The acrylic resin of Part 1 | 337.2 |
| Charge V | |
| N—ethyl-morpholine | 18.7 |
| Deionized water | 1165.5 |

The method of preparation was essentially the same as described in Example I, Part 2. The resultant resin had a viscosity of 465 centipoise measured with a No. 4 spindle at 50 rpm, a pH of 6.81, a solids content of 43.0 percent, milliequivalents of acid of 0.186 and milliequivalents of base of 0.130.

The above blend was used as a coating composition having a solids content of 38 percent, ICI viscosity of 160 centipoise at 25° C., milliequivalents of acid of 0.186 and milliequivalents of base of 0.130.

The coating was drawn down on an aluminum substrate which had been pretreated by phosphatizing and chromic acid rinse and baked at 193° C. for 10 minutes. The baked films weighed 31.3 milligrams per 4 square inches and had good acid and alkaline resistance.

EXAMPLE IV

This example illustrates the aqueous dispersion of a non-self dispersible resin comprising a polyester resin, in a blend with a phosphated epoxy.

| Ingredients | Parts by Weight (grams) |
|---|---|
| Phosphated epoxy[1] | 1740.2 |
| Polyester resin[2] | 234.9 |
| N—ethylmorpholine | 16.0 |

-continued

| Ingredients | Parts by Weight (grams) |
| --- | --- |
| Deionized water | 1114.1 |

[1] The phosphated epoxy was essentially of the same composition as that of Example I, Part 2, and having 63.5 percent total solids.
[2] The polyester resin had a solids content of 83 percent in hydroxyethylacetate, an acid value of 18.7, a hydroxyl value of 100 and was derived from trimethylpentanediol, adipic acid and isophthalic acid.

The phosphated epoxy was heated to 123° C. and the polyester resin was added thereto. The resultant mixture was held at 115° C. for 30 minutes and the N-ethylmorpholine was added thereto. The resultant mixture was held for 15 minutes and the deionized water was added thereto. The resultant aqueous dispersion had a solids content of 42.9 percent (at 150° C.), viscosity of 47.8 seconds (with a number 4 Ford cup); milliequivalents of acid was 0.172 and milliequivalents of base was 0.103; particle size was 3100 Angstroms.

A coating composition of the above aqueous dispersion, in admixture with 5 percent based on total solids of CYMEL 1116 was prepared, applied to substrates and evaluated as follows.

The coating was drawn down on a substrate comprising aluminum pretreated by phosphating and chromic acid rinse. Films obtained therefrom weighed at 28.5 milligrams per 4 square inches. The films had good alkaline, acid, solvent resistance and good (water-boil) adhesion.

EXAMPLE V

This example illustrates an aqueous dispersion of a non-self dispersible resin comprising a high solids hydroxyl-terminated polybutadiene and a phosphated epoxy.

The phosphated epoxy which was the same as described in Example IV was blended with the hydroxyl-terminated polybutadiene and dispersed in an aqueous medium as follows.

| Ingredients | Parts by Weight (grams) |
| --- | --- |
| Phosphated epoxy | 1740.2 |
| Polybutadiene[1] | 195 |
| N—ethylmorpholine | 16 |
| Deionized water | 1144.0 |

[1] The polybutadiene was a homopolymer having a molecular weight of 2800, milliequivalents of hydroxyl groups per gram was 0.082, and available from Arco Chemical Company as R-45HT.

The phosphated epoxy was heated to 120° C. and the polybutadiene was added thereto. The resultant mixture was heated for 30 minutes at 112° C. Thereafter, the N-ethylmorpholine was added over 98°-96° C. over 15 minutes. At 56° C., the deionized water was added to disperse the reaction mixture.

The resultant aqueous dispersion had a solids content (at 150° C.) of 43.0 percent, milliequivalents of acid was 0.062, milliequivalents of base was 0.043 and viscosity was 23.2 seconds, measured with a number 4 Ford cup; particle size was 2930 Angstroms.

A coating composition containing the above dispersion in admixture with 5 percent CYMEL 1116 was prepared. The percentage was based on total resin solids.

The coating composition was drawn down on an aluminum substrate, pretreated by phosphating and chromic acid rinse. Films obtained therefrom were baked at 232° C. for 8 seconds. The films weighed at 30.2 milligrams per 4 square inches. The film displayed good acid and alkaline resistance and good solvent resistance and very good (water boil) adhesion.

What is claimed is:

1. An aqueous composition comprising:
    (i) a resin which is non-self dispersible with a base, in water,
    (ii) a non-gelled phosphated-epoxy which is derived from reacting a 1,2-epoxy material with a phosphoric acid, said phosphated-epoxy being present in an amount sufficient to effect dispersion of the resin of (i) in the aqueous composition,
    (iii) a neutralizing base, and
    (iv) water.

2. An aqueous composition of claim 1, wherein the non-gelled phosphated-epoxy is derived from reacting a 1,2-epoxy material which is a polyepoxide.

3. An aqueous composition of claim 2, wherein the polyepoxide is a polyglycidyl ether of a polyol having an epoxy equivalent of 190 to 3800.

4. An aqueous composition of claim 3, wherein the epoxy equivalent is 800 to 3800.

5. An aqueous composition of claim 1, wherein the ratio of reaction is 0.1 to 1 mole of phosphoric acid per equivalent of an epoxy.

6. An aqueous composition of claim 5, wherein the ratio of reaction is 0.1 to 0.5 mole of phosphoric acid per equivalent of an 7. An aqueous composition of claim 1, wherein the non-self dispersible resin is low acid-containing or acid-free and is selected from the group consisting of a vinyl addition resin, polyester, alkyd, polybutadiene and polyurethane.

8. An aqueous composition of claim 7, wherein the vinyl addition resin is derived from ethylenically unsaturated monomers at least one of which contains an N-alkoxymethylamide group.

9. An aqueous composition of claim 8, wherein the N-alkoxymethylamide group is N-butoxymethylacrylamide or N-ethoxymethylacrylamide.

10. An aqueous composition of claim 1, wherein the base is triethylamine, N-ethylmorpholine, ammonia or a mixture thereof.

11. A process for dispersing in water a resin which is non-self dispersible with a base in water, said process comprising:
    (1) preforming a blend of the resin with an ungelled phosphated-epoxy which is derived from reacting 1,2-epoxy material with a phosphoric acid by, said phospated-epoxy being present is an amount sufficient to effect dispersion of said resin in the aqueous composition, followed by
    (2) dispersing the blend with a base an water.

12. A process of claim 11, wherein the non-gelled phosphated epoxy is derived from reacting 1,2-epoxy material which is a polyepoxide.

13. A process of claim 11, wherein the polyepoxide is a polyglycidyl ether of a polyol having an epoxy equivalent of 190 to 3800.

14. A process of claim 13, wherein the epoxy equivalent is 800 to 3800.

15. A process of claim 11, wherein the ratio of reaction is 0.1 to 1 mole of acid per equivalent of an epoxy.

16. A process of claim 15, wherein the ratio of reaction is 0.1 to 0.5 mole of acid per equivalent of an epoxy.

17. A process of claim 11, wherein the non-self dispersible resin is low acid-containing or acid-free and is selected from the group consisting of a vinyl addition resin, polyester, alkyd, polybutadiene and polyurethane.

18. A process of claim 17, wherein the vinyl addition resin is derived from ethylenically unsaturated monomers at least one of which contains an N-alkoxymethylamide group.

19. A process of claim 18, wherein the N-alkoxymethylamide group is N-butoxymethylacrylamide or N-ethoxymethylacrylamide.

20. A process of claim 11, wherein the base is N-ethylmorpholine, triethylamine, ammonia or a mixture thereof.

21. An aqueous composition which is prepared by the process of claim 11.

22. A water-based coating composition comprising on a resin solids basis from about 5 to 90 percent by weight of a non-self dispersible resin and 95 to 10 percent by weight of a phosphated epoxy and a curing agent.

23. A water-based coating composition of claim 22 comprising from about 10 to 50 percent by weight of the non-self dispersible resin.

24. A water-based composition of claim 22, wherein the non-self dispersible resin is a vinyl addition resin having an acid content of 4 percent or less based on the monomer content.

25. A water-based composition of claim 24, wherein the vinyl addition resin has an acid content of about 1 percent or less.

26. A water-based composition of claim 24, wherein the vinyl addition resin has a molecular weight of 8000 to 20,000.

27. A water-based coating composition of claim 22 wherein the curing agent is an aminoplast, a phenoplast or a blocked isocyanate.

28. A water-based coating composition of claim 24, wherein the vinyl addition resin is derived from monomers at least one of which comprises an N-alkoxyalkylamide group.

29. A coated substrate prepared by applying the coating of claim 22 to the substrate.

30. A coated substrate prepared by applying the coating of claim 28 to the substrate.

* * * * *

UNITED STATES PATENT AND TRADEMARK OFFICE
CERTIFICATE OF CORRECTION

PATENT NO. : 4,638,020

DATED : January 20, 1987

INVENTOR(S) : Roger M. Christenson et al

It is certified that error appears in the above-identified patent and that said Letters Patent is hereby corrected as shown below:

Claim 6, (column 12, line 27), at the end of the sentence, please add "epoxy." to complete the claim.

Claim 11, (column 12, line 48), please delete the word "by".

Claim 11, (column 12, line 49), please delete the word "is" and replace with "in".

Also in Claim 11, (column 12, line 52), please delete the word "an" and replace with "and".

Signed and Sealed this

Fifteenth Day of November, 1988

Attest:

DONALD J. QUIGG

Attesting Officer

Commissioner of Patents and Trademarks